(12) United States Patent
Licht et al.

(10) Patent No.: US 12,348,464 B2
(45) Date of Patent: Jul. 1, 2025

(54) SERVICE ASSISTANCE AND INTEGRATION

(71) Applicant: NCR Voyix Corporation, Atlanta, GA (US)

(72) Inventors: Yehoshua Zvi Licht, Alpharetta, GA (US); Joseph Arnold White, Encinitas, CA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/458,851

(22) Filed: Aug. 27, 2021

(65) Prior Publication Data
US 2021/0392095 A1 Dec. 16, 2021

Related U.S. Application Data

(63) Continuation of application No. 15/443,442, filed on Feb. 27, 2017, now Pat. No. 11,171,892.

(51) Int. Cl.
*H04L 51/02* (2022.01)
*H04L 51/04* (2022.01)

(52) U.S. Cl.
CPC .............. *H04L 51/02* (2013.01); *H04L 51/04* (2013.01)

(58) Field of Classification Search
CPC ......... H04L 67/10; H04L 67/01; H04L 51/02; H04L 63/08; H04L 63/10; H04L 67/02; H04L 67/306; H04L 63/0807; H04L 63/062; H04L 63/101; H04L 51/04; H04L 63/20; H04L 63/0428; H04L 63/0435; H04L 63/061; H04L 9/3263; H04L 51/046; H04L 67/535; H04L 9/0891; H04L 9/321; H04L 63/166; H04L 65/1069; H04L 9/14; H04L 61/4523; H04L 63/0442; H04L 63/065; H04L 67/12; H04L 67/53; H04L 9/083; H04L 9/30; H04L 9/3268; H04L 12/185; H04L 63/18; H04L 67/61; H04L 69/14; H04L 51/56; H04L 63/1425; H04L 67/63; H04L 12/1859; H04L 63/0876; H04L 12/66; H04L 67/565; H04L 2463/082; H04L 51/18; H04L 9/0637; H04L 63/107; H04L 67/1097; H04L 67/131; H04L 67/52; H04L 67/60; H04L 9/0861; H04L 51/08; H04L 63/1408;
(Continued)

(56) References Cited

U.S. PATENT DOCUMENTS

| | | | | |
|---|---|---|---|---|
| 2011/0038367 A1* | 2/2011 | Landers | ............ | H04M 3/42161 370/352 |
| 2012/0041903 A1* | 2/2012 | Beilby | ................... | G06N 3/004 706/11 |

(Continued)

FOREIGN PATENT DOCUMENTS

| | | | | | |
|---|---|---|---|---|---|
| EP | 2871574 | * | 5/2015 | ............... | G06F 9/44 |
| WO | WO-2012142342 A2 | * | 10/2012 | ........... | G06Q 30/016 |
| WO | WO-2014070467 A1 | * | 5/2014 | ..... | G06Q 10/063112 |

*Primary Examiner* — Djenane M Bayard
(74) *Attorney, Agent, or Firm* — Schwegman Lundberg & Woessner, P.A.

(57) ABSTRACT

An assistance integrator provides a front-end interface to an enterprise's backend services available to customers. The assistance integrator translates between automated chat conversations with the customers that engage the enterprise over messaging platforms for initiating actions with the backend services during those conversations.

20 Claims, 5 Drawing Sheets

(58) Field of Classification Search
CPC ... H04L 63/1441; H04L 67/51; H04L 9/0825; H04L 41/0816; H04L 41/5045; H04L 63/205; H04L 65/00; H04L 67/125; H04L 67/303; H04L 67/56; H04L 9/3213; H04L 9/3221; H04L 9/3247; H04L 9/3271; H04L 51/216; H04L 51/52; H04L 9/50; H04L 51/214; H04L 9/3239; H04L 63/12; H04L 67/141; H04L 2209/56; H04L 51/222; H04L 63/0823; H04L 67/148; H04L 61/3025; H04L 41/5041; H04L 41/5083; H04L 61/302; H04L 63/0421; H04L 63/083; H04L 63/0861; H04L 67/563; H04L 67/567; H04L 12/1818; H04L 12/1822; H04L 12/2821; H04L 12/2827; H04L 2012/285; H04L 45/125; H04L 45/22; H04L 43/0817; H04L 63/0884; H04L 41/0806; H04L 41/0853; H04L 41/147; H04L 41/149; H04L 43/065; H04L 61/4511; H04L 63/0815; H04L 63/0853; H04L 63/102; H04L 63/1466; H04L 63/1483; G06F 40/30; G06F 40/279; G06F 21/31; G06F 9/547; G06F 11/3438; G06F 8/33; G06F 40/58; G06F 11/302; G06F 9/541; G06F 11/3466; G06F 2201/86; G06F 3/0482; G06F 3/1454; G06F 8/30; G06F 9/454; G06F 16/24573; G06F 8/65; G06F 16/252; G06F 16/27; G06F 16/958; G06F 3/167; G06F 40/35; G06F 2009/45595

See application file for complete search history.

(56) References Cited

U.S. PATENT DOCUMENTS

| | | | |
|---|---|---|---|
| 2012/0072559 A1* | 3/2012 | Alzamil | G06Q 50/01 709/222 |
| 2017/0116982 A1* | 4/2017 | Gelfenbeyn | G10L 15/1815 |
| 2017/0237692 A1* | 8/2017 | Sheth | H04L 51/04 715/758 |
| 2017/0295114 A1* | 10/2017 | Goldberg | H04L 67/306 |
| 2017/0366478 A1* | 12/2017 | Mohammed | H04L 51/02 |
| 2019/0306107 A1* | 10/2019 | Galbraith | H04L 51/56 |

* cited by examiner

SERVICE ASSISTANCE AND INTEGRATION

CROSS-REFERENCE TO RELATED APPLICATION

This application is a continuation of U.S. patent application Ser. No. 15/443,442, filed Feb. 27, 2017, which application and publication is incorporated herein by reference in its entirety.

BACKGROUND

Individuals and businesses utilize a variety of messaging technologies to: socialize, communicate, and engage in business activities. Some of these messaging technologies include: email platforms, text platforms, instant messaging platforms, browser-based platforms, automated voice-based platforms, and a variety of social media platforms. Each specific type of messaging platform has its own set of interfaces and features, some of which may be device-type specific or may work better (with more features) on a given device type. Furthermore, most messaging platforms include their own Application Programming Interfaces (APIs) that permit automated and program-based interaction with features of the messaging platforms.

Different individuals prefer some messaging platforms over others. This creates a significant challenge for a business that wishes to engage their customers in seamless and automated manners on the messaging platforms that each customer prefers to use. The problem is compounded because each customer may prefer a different messaging platform depending on the device that the customer is operated at any given point in time (such as a laptop versus phone, a watch versus phone, etc.).

For every set of potential actions with a customer in an automated conversation over a specific messaging platform, a business has to deploy a variety of customized logic to decipher the conversation (voice or text-based) into intentions of the customer that then map to specific backend actions that are to be processed by specific backend services of the business. Consequently, businesses typically offer very limited or no automated interaction at all to their customers over messaging platforms and any such interaction is often limited to a specific backend service of the business over a specific messaging platform.

This restricts the accessibility of the business's services and provides an environment in which the business's customers may have incentive to switch to a different business that is more accessible to the customer.

SUMMARY

In various embodiments, methods and a system for service assistance and integration are presented.

According to an embodiment, a method for service assistance and integration is provided. Specifically, and in one embodiment, a selection is received that identifies a backend service. Next, a mode of activation is obtained for the selection. Finally, an assistance integrator is activated over a messaging platform for engaging a customer in an automated session using the mode of activation for customer interaction with the backend service.

DETAILED DESCRIPTION

Figure 1A:
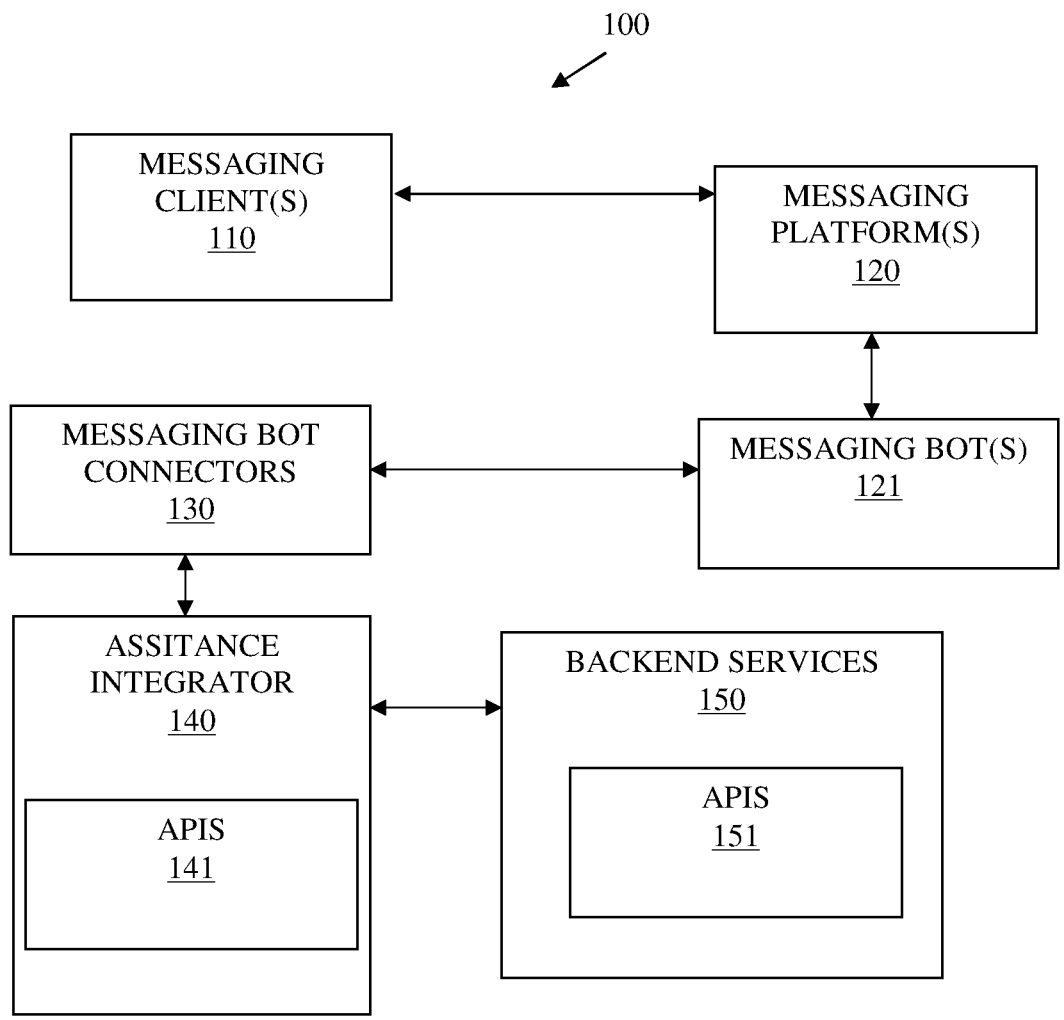
FIG. 1A is a diagram of a system for a service assistance and integration system, according to an example embodiment.

FIG. 1A is a diagram of a system 100 for a service assistance and integration system, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the service assistance and integration techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for service assistance and integration can be implemented in all, or some combination of the components shown in different hardware computing devices having one or more hardware processors.

The system 100 includes: one or more messaging clients 110, one or more messaging platforms 120, one or more automated messaging bots 121, one or more messaging bot connectors 130, an assistance integrator 140 having a plurality of Application Programming Interfaces (APIs) 141, and one or more backend services 150 of a business having a plurality of APIs 151.

The messaging client 110 can be processed on any processor-enabled device, such as but not limited to: a desktop computer, a laptop computer, a mobile phone, a tablet, a wearable processing device (watch, goggles, etc.), a processor-enabled vehicle interface within a vehicle, an intelligent appliance (light switch, lamp, garage door opener, refrigerator, television, stereo, etc.), a server, etc.

As used herein, a "messaging platform" refers to the software, interfaces, APIs, processing devices, and network connectivity used to perform messaging communications by users. A messaging platform includes, by way of example only, email, Short Message Service (SMS) text, instant message, voice-based applications (e.g., Amazon Echo™, Google Home™, etc.), and social-media applications (e.g., Facebook™, Slack™, Twitter™, Instagram™, Snap Chat™, LinkedIn™, Skype®, Kik™, Google Allo®, Line™, a variety of match making services, etc.).

As used herein, a "messaging bot" 121 of "bot" 121 refers to a software application that is designed to engage in messaging activities in an automated manner as an active or passive participant within a specific messaging platform 121 for a specific conversation or within multiple disparate messaging platforms 121 for a specific conversation or a set of types of conversations. A messaging bot 121 is a logical participant in a given chat session (messaging session or dialogue) or conversation for any given messaging platform. Moreover, a messaging bot 121 is configured to perform a variety of pre-configured automated actions within messaging platforms and/or outside the messaging platforms.

A "conversation" is a specific type of chat session that has engaged a bot 121 to perform some service based on a derived "intention" of the conversation. Therefore, the conversation includes a subject matter that the bot 121 is able to decipher from interaction with a user in the chat session, with the subject matter leading to a perceived intention of the user during the chat session. The intention leading to additional actions that may be taken by the bot 121 outside or out-of-band with the chat session in a given messaging platform 121.

The conversation and intention can be determined through existing natural language processing techniques and can include speech of the user in the chat session, video images of gestures taken by the user during a chat session, and/or text (or various combinations of speech, gestures, and written text).

A conversation is assigned to a conversation type. The conversation type can include transactions or requests made by a user that include, by way of example only, loyalty service transactions, customer service transaction, venue-based transactions, reservation-based transactions, recommendation-based transactions, order-based transactions, payment-based transactions, security-based transactions, service configuration-based transactions, notification-based transactions, search-based requests, information-based requests, registration-based requests, and the like.

In an embodiment, the messaging client 110 (is also referred to as a "messaging application (app)" 110) includes no software changes or modifications for interaction with the bot 121 to be operational and perform the processing discussed herein and below. That is, from the perspective of the messaging platform 120 and the messaging app 110, the messaging bot 121 (also referred to as "messaging bot 121 or bot 121, herein) is a real user or participant (albeit the bot 121 is a logical participant) that processes an existing API of the messaging platform 120 to appear as a participant.

In an embodiment, it is to be noted that the bot 121 need not processing on a same device as the corresponding messaging app 110. So, a bot 121 can engage a user through the user's messaging app 110 on the user's operated device by being engaged for a chat session at the direction of the user or indirectly at the direction of a bot connector 130. The bot 121 may include a valid unique-user identifier and account for the messaging platform 120 that the bot 121 is active within. The actually device that executes the bot 121 can be a server or cloud (set of logically cooperating servers).

In some embodiments, the bot 121 may process within the local processing contexts and on the devices that process the corresponding messaging apps 110.

One benefit by retaining the bot 121 in a cloud processing environment is that any updates and enhancements to the bot 121 can be achieved without updates to the devices having the messaging app 110. Furthermore, a single base version of the bot 121 can exist in the cloud and support multiple disparate users through use of user-customization profiles that include user-specific configurations of the bots 121. In this manner, when a specific user identifies or indirectly causes the bot 121 to engage from the user's messaging app 110, a cloud service can cause the base bot to be initiated and apply the that user's specific preferences/configurations to create a running instance of the bot 121 that is specific and customized to the user (based on the user's identifier for the messaging platform 120).

In an embodiment, the bot 121 is configured to process automated conversations of a particular conversation type or subset of conversation types (discussed above). In an embodiment, the bot 121 is configured to process over a specific messaging platform 120 or processes over a set of disparate messaging platforms 120. In an embodiment, the bot 121 is configured to process a specific conversation type over a specific messaging platform 120.

The messaging bot connector(s) 130 receive messaging platform-specific messages from a bot 121 in connection with chat sessions and conversations that the bot 121 has with a user and relays those messages in a format that can be processed by the assistance integrator 140 through exposed APIs 141 of the assistance integrator 140. The bot connector 130 also relays messages received from the assistance integrator 140 (received in a format of the APIs 141 from the assistance integrator 140) to a specific bot 121 that is either engaged in an existing chat session with a user or wants to engage the user in a new chat session based on the message from the assistance integrator 140. The bot connector 130 handles translation between the assistance integrator 140 and the bot 121 (such that a relayed message from the assistance integrator 140 to the bot 121 is translated from the API 141 to an API of the messaging platform 120 that the bot 121 is active on.

The bot connector 130 identifies the appropriate bot 121 to engage. The bot 121 engages in with the user in a conversation over a specific messaging platform 120 through the user's messaging client 110. The bot connector 130 processes as a front-end interface to the assistance integrator 140, such that the assistance integrator 140 does not have to be configured for engaging a variety of different bots 121 over a variety of different messaging platforms 120.

The assistance integrator 140 processes as a front-end interface to a variety of backend services 150 offered by a business, these services 150 can include services for: purchasing goods or services, registering with services, loyalty transactions, searching, recommendations, security (authentication), configuring user preferences with a particular service, notifications, customer service, support, information-based inquiries, transactions, warranties on goods or services, booking arrangements for travel or sporting events, venue requests, etc.

The assistance integrator 140 interacts with the backend services 150 through service-exposed APIs 151.

In an embodiment, the assistance integrator 140 is configured for interaction with service-exposed APIs 151 based on a configuration interface that allows the business to select the specific services that the business wishes to expose over messaging platforms 120 to customers. Once selections are made, the APIs 151 are activated, configured, and installed in the assistance integrator 140. The assistance integrator 140 is then activated and the business is capable of providing the selected services over the messaging platforms 120. In an embodiment, the configuration interface can also include options for selecting the specific messaging platforms 120.

In an embodiment, the business may include its own existing bots over some of the desired platforms 120, such that modification to these existing bots require no modification or are unchanged and utilized with the teachings presented herein. This can be achieved by configuring the assistance integrator 140 as a proxy to the backend services 150 that the existing bots communicate with when providing automated services over the messaging platforms 120, such that unbeknownst to the existing bots when calls are made to the backend services 150, the calls are intercepted and processed by the assistance integrator 140. This arrangements allows existing bots that businesses have specialized for specific platforms 120 and specific backend services 150 to be leveraged and processed within any significant integration and changes to the processing. The business can also expand the number of available backend services 150 and messaging platforms 120 by utilizing bots for other types of conversations, which the business previously lacked.

The operation of the system 100 will now be discussed within the context of a sample architecture of a service assistance and integration system 100, depicted in the FIG. 1B.

The architecture depicted includes a variety of available backend services 150 of an enterprise that are accessible through service-specific APIs 151, such as: loyalty service 151A, customer service 151B, venues services 151C, search service 151D, reservation service 151E, party service 151E, recommendation service 151G, order service 151H, payment service 151I, transaction service 151J, security service 151K, push services 151L, configuration services 151M, and setting services 151N. Again, these backend services 150 are accessible and processed over a network through the APIs 151A-151N. Some of these services 150 may natively reside on a server associated with the enterprise (business) while other of these services may be supplied through a cloud from third-parties that manage some or all of the transactional and/or customer data of the business. Such, that some of the services 150 may be processed by the business as Software-as-a-Service (SaaS).

In an embodiment, the assistance integrator 140 is also provided to the business through a cloud processing environment as a SaaS.

Initially, the business access a configuration interface over a network connection (such as an Internet connection) by accessing a website associated with the assistance integrator 140. A user of the business then selects the services, which activates the APIs 151A-151N and links to the business data (transactional, metric, customer, etc.) of the business. The business also identifies the messaging platforms 120 and any accounts that the business has on those messaging platforms 120. In an embodiment, the business selects the available languages (English, Spanish, German, etc.) and/or dialects for a language. The business may also indicate whether the assistance integrator 140 is to be active over voice, video with gestures, and/or through text (written) chat sessions. After these selections, the assistance integrator 140 is configured and initiated within the cloud.

For example, consider Whole Foods™ includes a variety of services, such as registering as a loyalty member, ordering food online, and paying for food online. The business data for managing the customers and the business is provided by a subset of the services (which are outsourced) to third-party vendors. Whole Foods™ accesses an API for activating the assistance integrator 140 and selects loyalty, registration, payment, and ordering. Next, selections are made for English language, along with voice and text (activation). After selections are made, Whole Foods™ pays to activate the assistance integrator 140. A customer can then activate an Amazon Echo® in a voice conversation to purchase groceries for pickup at the local Whole Foods™. When the name Whole Foods™ is recognized, a message is sent to the bot connector 130 and a bot 121 is activated for interaction through Echo®. The bot 121, the bot connector 130, the assistance integrator 140, and the appropriate backend services 150 of Whole Foods™ all interact to take the customer's order through the voice conversation with Echo™ with Whole Foods™.

This is a substantial savings in time and effort for Whole Foods™ and can be achieved in minutes through the configuration and registration interface. The organization and interfaces are pre-existing and managed through the assistance integrator 140 and the bot connector 130.

During operation, a customer of the business then initiates a chat session with the business over a messaging platform 120. This activates a bot connector 130 when the business is identified in the chat session. The bot connector 130 identifies the customer through the identifier associated with the sender (which is the customer) and routes the chat session to a specialized bot 121. The bot 121 relays messages from the chat session to the bot connector 130 and the bot connector 130 relays to the assistance integrator 140 using the exposed APIs 141. The assistance integrator 140 may enlist an external artificial intelligence as a service 142 to translate the message into a conversation 141A having one or more customer-resolved intentions 141B. The assistance integrator 140 than takes actions mapped to the intentions on behalf of the customer with the appropriate backend services 150 using the appropriate exposed APIs 151A-151N.

The data associated with the conversation 141A, intentions 141B, the actions taken with the APIs 151A-151N are sent to a log/trace 143. Concurrently, a business exposed analytic service 144 makes metrics and analytics associated with the log/trace 143 data available through an Analytics API 144A to users through the messaging client devices 110.

The backend services 150 perform the actions and reply with messages or results to the assistance integrator 140. The assistance integrator 140 uses the API 141 to report to the bot connector 130. The bot connector 130 translates the messages or results and provides the bot 121 and the bot 121 communicates through speech or text in the chat session with the user through the messaging client 110 over the messaging platform 120.

These and other embodiments are now discussed with reference to the FIGS. 2-4.

Figure 2:
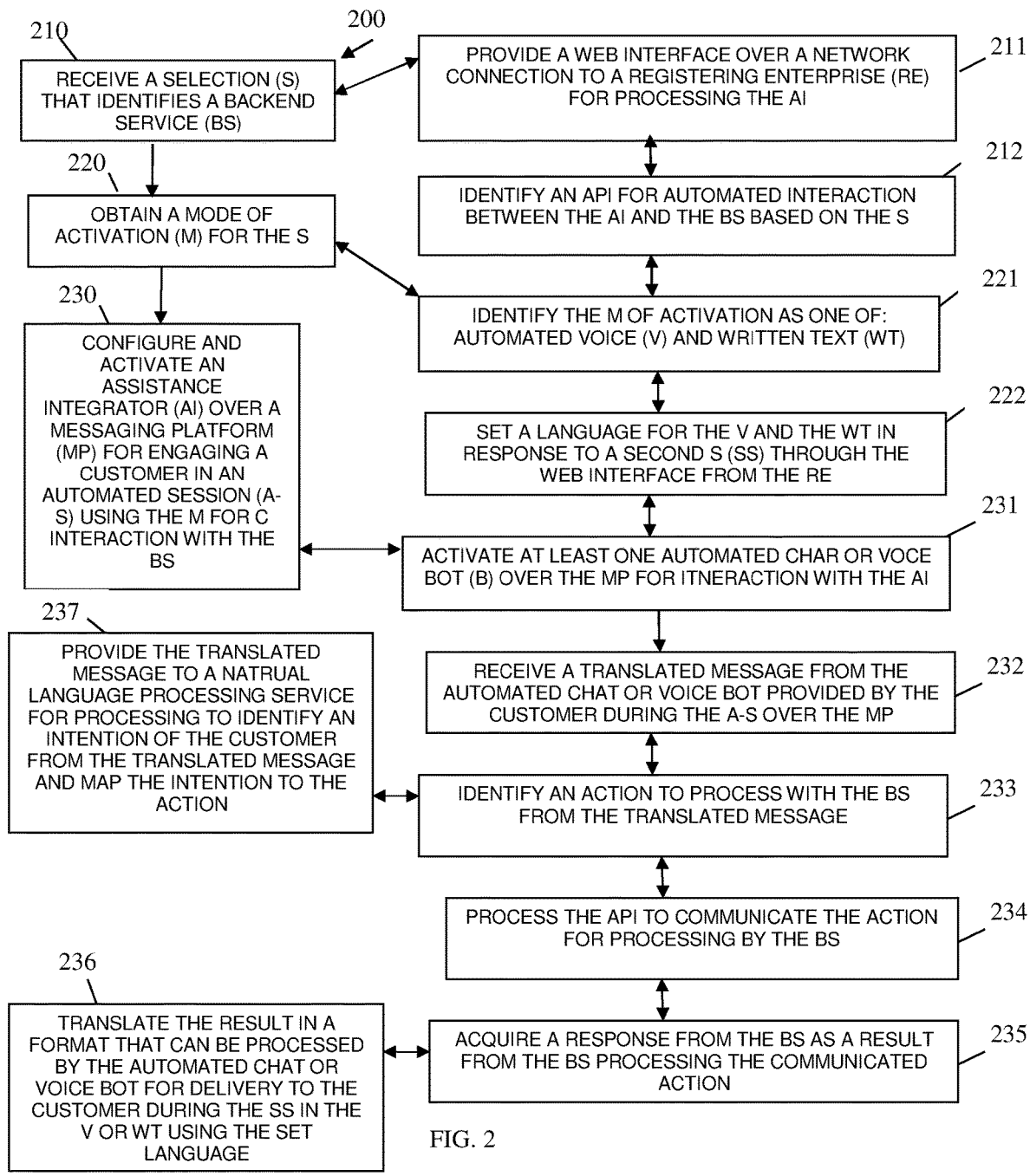
FIG. 2 is a diagram of a method for service assistance and integration, according to an example embodiment.

FIG. 2 is a diagram of a method 200 for service assistance and integration, according to an example embodiment. The software module(s) that implements the method 200 is referred to as a "virtual assistance manager." The virtual assistance manager is implemented as executable instructions programmed and residing within memory and/or a non-transitory computer-readable (processor-readable) storage medium and executed by one or more hardware processors of a hardware computing device. The processors of the device that executes the virtual assistance manager are specifically configured and programmed to process the virtual assistance manager. The virtual assistance manager has access to one or more networks during its processing. The networks can be wired, wireless, or a combination of wired and wireless.

In an embodiment, the device that executes the virtual assistance manager is the device or set of devices that process in a cloud processing environment.

In an embodiment, the device that executes the virtual assistance manager is a server.

In an embodiment, the virtual assistance manager is some combination of or all of: the bot connector 130, the bot 121, and the assistance integrator 140.

At 210, the virtual assistance manager receives a selection that identifies a backend service. In an embodiment, the backend service is any of the services 150 discussed above with the FIGS. 1A-1B.

In an embodiment, at 211, the virtual assistance manager provides or exposes a web interface over a network connection to a registering enterprise (user or analyst of the registering enterprise) for processing an assistance integrator (discussed below at 230 and in an embodiment, the assistance integrator is the assistance integrator 140 of the FIGS. 1A-1B).

In an embodiment of 211, and at 212, the virtual assistance manager identifies an API for automated interaction between the assistance integrator and the backend service based on the selection from the web interface. In an embodiment, the API is any of the APIs 151A-151N discussed above with the FIG. 1B.

At 220, the virtual assistance manager obtains a mode of activation for the selection.

According to an embodiment of 212 and 220, at 221, the virtual assistance manager identifies the mode of activation as one or both of automated voice interaction, automated video gesture-based interaction, and/or automated written text interaction.

In an embodiment of 221 and at 222, the virtual assistance manager sets a language for the automated voice, automated video gesture-based, or automated written text in response to a second selection through the web interface received from the registering interface. The language is a human-communication language, such as, and by way of example only, English, Spanish, French, German, Russian, Chinese, etc.

At 230, the virtual assistance manager configures and activates an assistance integrator (such as assistance integrator 140) over a message platform for engaging a customer in an automated session using the mode of activation for customer interaction with the backend service.

In an embodiment, the backend service includes no interface or capability for interaction with the messaging platform; however, the assistance integrator provides the capability as a conduit or a proxy between the messaging platform and the backend service.

In an embodiment of 222 and 230, at 231, the virtual assistance manager activates at least one automated chat, video, or voice bot over the messaging platform for interaction between the customer and the assistance integrator during the automated session.

In an embodiment of 231 and at 232, the virtual assistance manager receives a translated message from the automated voice, video, or chat bot. The message provided by the customer during the automated session over the messaging platform. The customer interaction is through a messaging client 110 operating on a customer-operated device, such as mobile phone, wearable processing device, laptop, desktop, intelligent applicant, or a computing-enabled device part of the Internet-of-Things (IoTs).

In an embodiment of 232 and at 233, the virtual assistance manager identifies an action to process with the backend service from the translated service.

In an embodiment of 233 and at 234, the virtual assistance manager processes the API to communicate the action for processing by the backend service.

In an embodiment of 234 and at 235, the virtual assistance manager acquires a response from the backend service as a result from the backend service processing the communicated action.

In an embodiment of 235 and at 236, the virtual assistance manager translates the result in a format that can be processed by the automated chat, video, or voice bot for delivery to the customer during the automated session in the automated voice, video, or written text using or in the set human-communication language.

In an of 233 and at 237, the virtual assistance manager provides the translated message to a natural language processing service for processing to identify an intention expressed by the customer in the mode within the message. The natural language processing service identifies the customer's intention from the translated message. The virtual assistance manager maps the intention to the action that can be processed by the backend service.

The virtual assistance manager provides a configuration interface and a mechanism for integrating backend services of an enterprise for automated customer interaction over messaging platforms. The messaging platforms can be any of the messaging platforms discussed above with the FIGS. 1A-1B.

Figure 3:
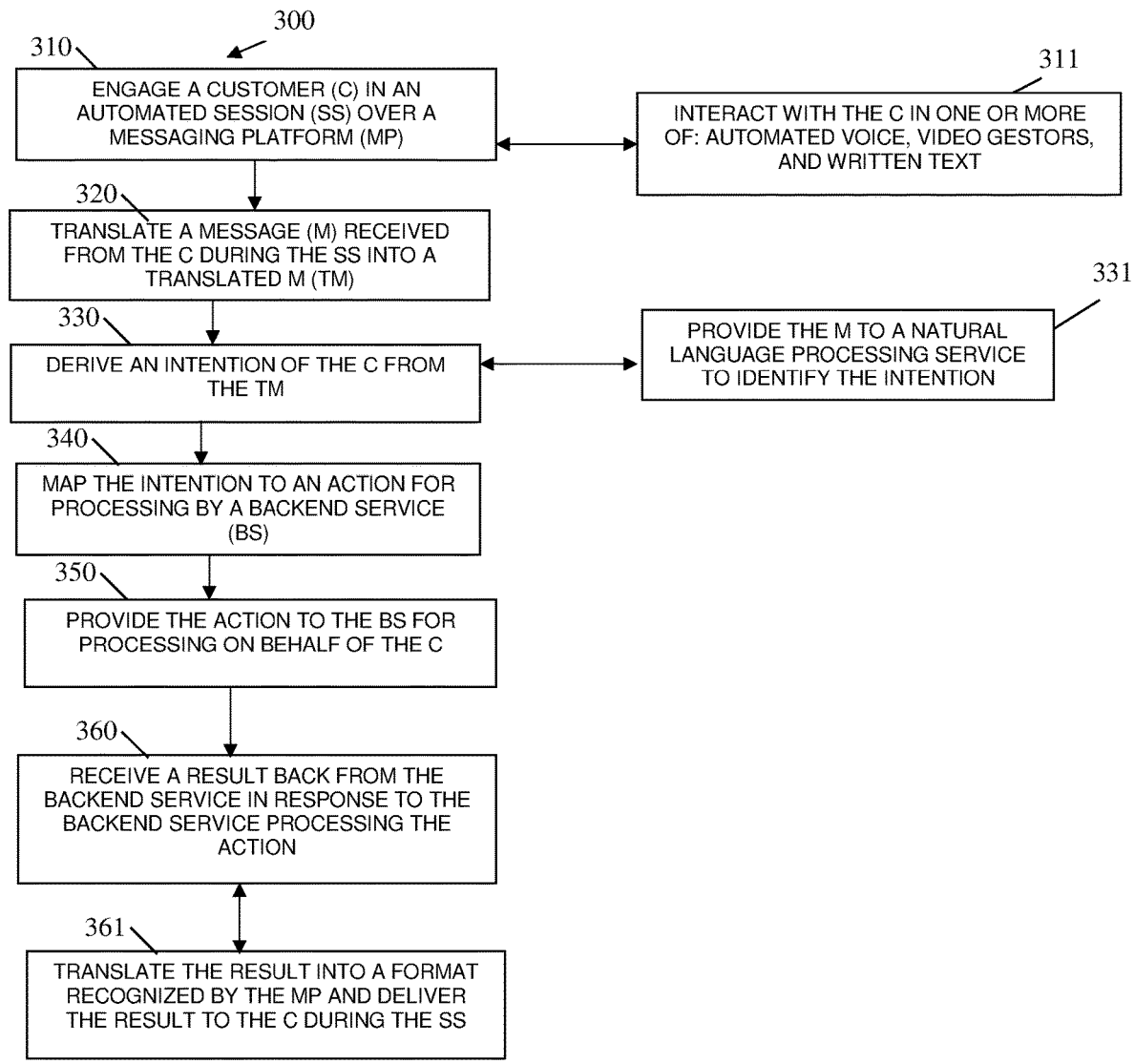
FIG. 3 is a diagram of another method for service assistance and integration, according to an example embodiment.

FIG. 3 is a diagram of another method 300 for service assistance and integration, according to an example embodiment. The software module(s) that implements the method 300 is referred to as an "assistance integrator." The assistance integrator is implemented as executable instructions programmed and residing within memory and/or a non-transitory computer-readable (processor-readable) storage medium and executed by one or more hardware processors of a hardware device. The processors of the device that executes the assistance integrator are specifically configured and programmed to process the assistance integrator. The assistance integrator has access to one or more networks during its processing. The networks can be wired, wireless, or a combination of wired and wireless.

The assistance integrator presents another and in some ways enhanced perspective of the method 200.

In an embodiment, the assistance integrator is some combination of or all of: the bot connector 130, the bot 121, the assistance integrator 140, and the method 200.

In an embodiment, the device that executes the assistance integrator is a server.

In an embodiment, the device that executes the assistance integrator is a cloud processing environment.

At 310, the assistance integrator engages a customer in an automated session over a messaging platform. The customer operates a customer-operated device that processes a messaging client 110. The messaging platform can be any of the messaging platforms discussed above with the FIGS. 1A-1B.

According to an embodiment, at 311, the assistance integrator interacts with the customer using a mode that is one or more of: automated voice, video gestures, and/or written text.

At 320, the assistance integrator translates a message received from the customer during the automated session into a translated or normalized message format.

At 330, the assistance integrator derives an intention of the customer from the translated message.

In an embodiment, at 331, the assistance integrator provides the message to a natural language processing service to identify the intention.

At 340, the assistance integrator maps the intention to an action for processing by a backend service. For instance, the intention or an identifier for the intention is searched for in a table, a matching entry in the table includes an identifier for the action and the backend service (as well as, perhaps, an API for communicating the action to the backend service).

At 350, the assistance integrator provides the action to the backend service for processing on behalf of the customer.

In an embodiment, at 360, the assistance integrator receives a result back from the backend service in response to the backend service processing the action.

In an embodiment of 360 and at 361, the assistance integrator translates the result into a format recognized by the messaging platform and delivers the result to the customer during the automated session.

Figure 4:
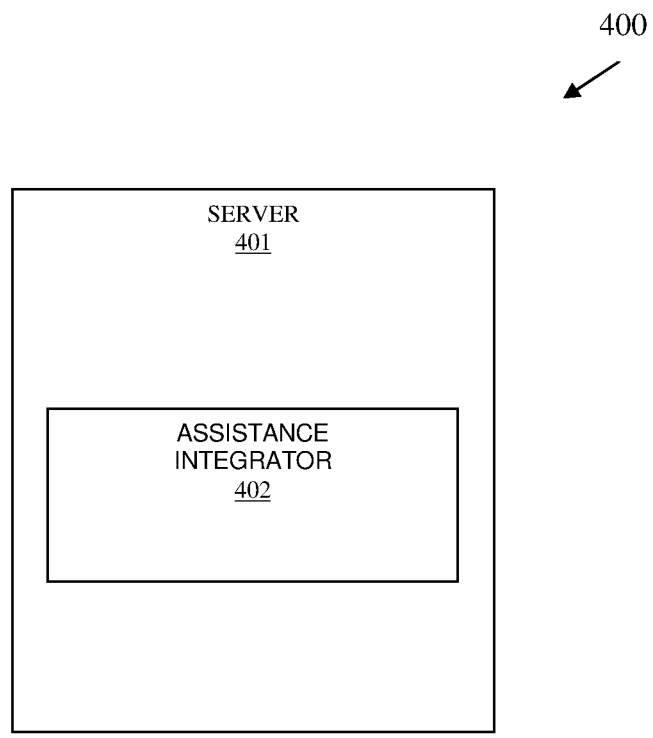
FIG. 4 is a diagram of another system service assistance and integration, according to an example embodiment.

FIG. 4 is a diagram of another system 400 for service assistance and integration, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including an assistance integrator 402.

The assistance integrator 402 is configured to: 1) execute on at least one hardware processor of the server 401; 2) engage in an automated session with a customer over a messaging platform, 3) derive an intention from a message provided by the customer during the automated session, 4) map the intention to an action for processing by a backend service, and 5) process an API for the backend service to cause the backend service to process the action on behalf of the customer.

In an embodiment, the assistance integrator 402 is further configured to: 6) provide a result received from the backend service in response to processing the action to the customer during the automated session.

In an embodiment, the assistance integrator 402 is further configured, in 2), to: engage the customer in one or more of: automated voice interactions, automated gesture-recognized video interactions, and automated written text interactions.

Figure 1B:
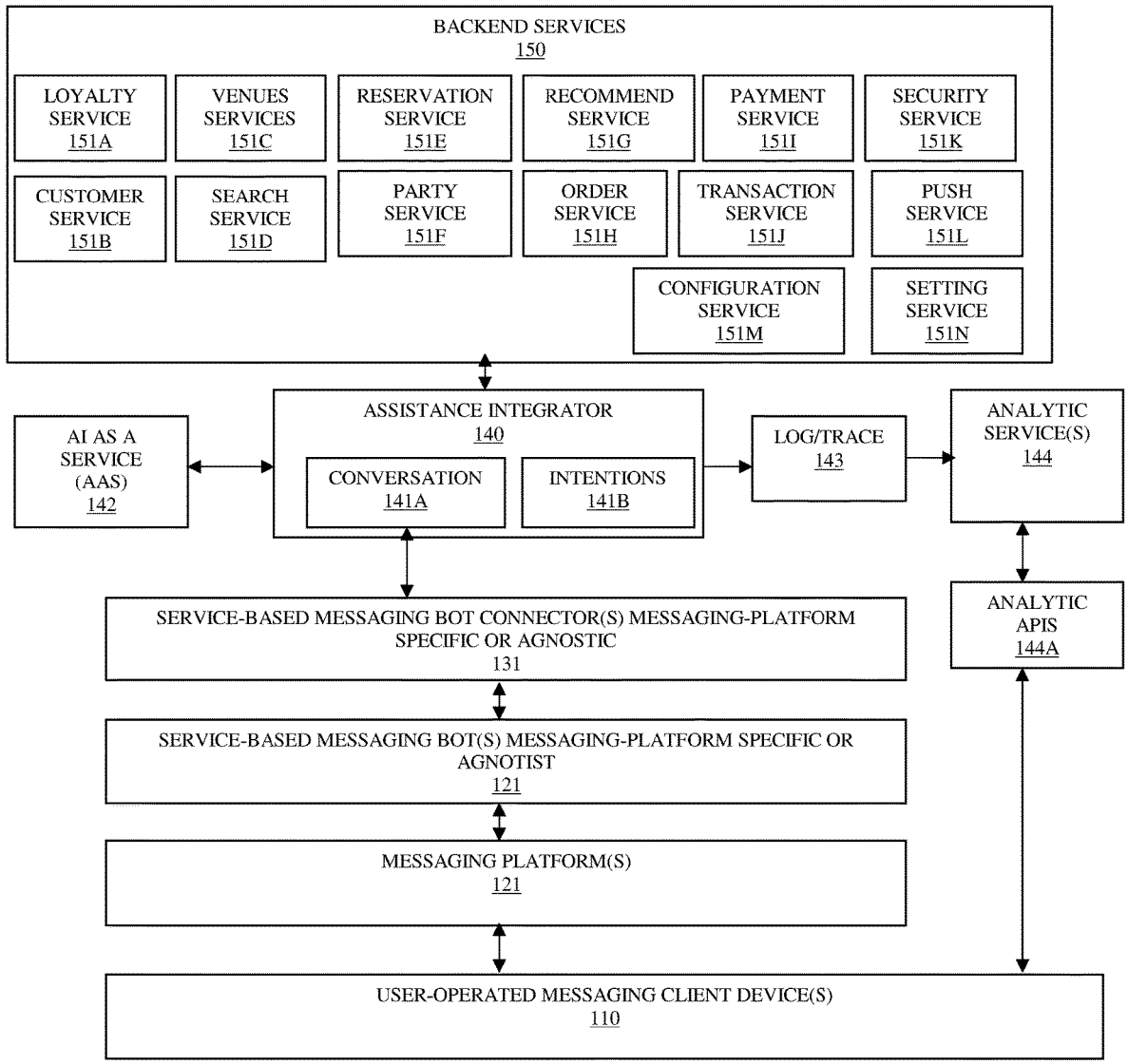
FIG. 1B is a diagram of a sample architecture of a service assistance and integration system, according to an example embodiment.

In an embodiment, the assistance integrator 402 is all or some combination of: the bot connector 130, the bot 121, the assistance integrator 140, the system 100, the architecture of the FIG. 1B, the method 200, and the method 300.

In an embodiment, the backend service is the backend service 150. In an embodiment, the API is any one of, all, or some combination of the APIS 151A-151N.

In an embodiment, the messaging platform is any of the messaging platforms referenced above with the FIGS. 1A-1B.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing a configuration interface to an enterprise;
receiving a service selection for a backend service provided by the enterprise through the configuration interface;
linking an Application Programming Interface (API) to the backend service, wherein the API is a pre-existing API used by the enterprise with the backend service;
obtaining transactional, customer, and metric data from the backend service using the API;
receiving a messaging platform identifier for a messaging platform and receiving an account associated with the enterprise with the messaging platform;
configuring an automated bot to monitor the account of the enterprise on the messaging platform to provide the service on behalf of the enterprise;
deploying the automated bot on the messaging platform to engage customers in messaging chat sessions and provide the service by translating customer interactions into API calls sent to the backend service through the API and processed by the backend service;
wherein the automated bot uses an existing API of the messaging platform to interact during the chat sessions and the automated bot appears as a real participant of the messaging platform;
wherein the automated bot determines intentions of the customers during the messaging chat sessions based on speech of the customers, images of gestures taken by the customers, and written text provided by the customers;
wherein the automated bot is configured to perform a variety of pre-configured automated actions within the messaging platform and outside the messaging platform;
wherein the automated bot processes as a front-end interface to provide the service of the backend service over the messaging platform.

2. The method of claim 1, wherein receiving a messaging platform further includes receiving one or more modes of interaction that the enterprise wants the automated bot to support when providing the service through the interface.

3. The method of claim 2, wherein receiving the one or more modes of the interaction further includes receiving two modes of interaction for natural language dialogues and for natural language voice dialogues through the interface.

4. The method of claim 3, wherein receiving the two modes of interaction further includes receiving spoken language selections for each of the two modes of interaction that the automated bot is configured to support through the interface.

5. The method of claim 1 further comprising, processing the automated bot as a frontend interface to provide the service of the backend service over the messaging platform.

6. The method of claim 1, wherein deploying further includes engaging, by the automated bot, a particular customer in a particular chat session to enroll in a loyalty program of the enterprise through the backend service.

7. The method of claim 1, wherein deploying further includes engaging, by the automated bot, a particular customer in a particular chat session to perform a loyalty transaction with the enterprise through the backend service.

8. The method of claim 1, wherein deploying further includes, engaging, by the automated bot, a particular customer in a particular chat session to perform a purchase transaction with the enterprise through the backend service.

9. The method of claim 1, wherein deploying further includes, engaging, by the automated bot, a particular customer in a particular chat session to place a food order with the enterprise through the backend service.

10. The method of claim 1, wherein deploying further includes translating responses received from the backend service through the API into natural language and communicating the responses to the customers during the chat sessions.

11. A method, comprising:
- deploying an automated bot to monitor a messaging platform for an enterprise;
- engaging, by the automated bot, a customer over the messaging platform in a chat session using natural language, wherein the automated bot uses an existing API of the messaging platform to interact during the chat session and the automated bot appears as a real participant of the messaging platform;
- detecting, by the automated bot and during the chat session, a transaction desired by the customer with the enterprise;
- translating, by the automated bot, details of the transaction into Application Programming Interface (API) calls recognized by a backend online transaction service of the enterprise and sending the API calls to the backend online transaction service for processing, wherein the API calls are pre-existing API calls uses to access the backend online transaction service by the enterprise; and
- determining, by the automated bot, intentions of the customer from speech of the customer, images of gestures taken by the user, and written text provided by the customer during the chat session;
- wherein the automated bot is configured to perform a variety of pre-configured automated actions within the messaging platform and outside the messaging platform;
- wherein the automated bot translates the result into a format recognized by the messaging platform and delivers the result to the customer during the automated session.

12. The method of claim 11 further comprising, translating, by the automated bot, responses received via additional API calls from the backend online transaction service into the natural language and communicating the responses to the customer during the chat session.

13. The method of claim 11 further comprising, processing the automated bot for the backend service to provide on behalf of the enterprise a transaction service, a loyalty service, a customer service, an order service, a payment service, and a reservation service through the messaging platform.

14. The method of claim 11 further comprising, capturing, by the automated bot, metrics for the chat session and using the API calls to communicate the metrics to the backend service of the enterprise.

15. The method of claim 11, wherein engaging further includes establishing, by the automated bot, the chat session as a natural language text-based session with the customer.

16. The method of claim 11, wherein engaging further includes establishing, by the automated bot, the chat session as a natural language voice-based session with the customer.

17. The method of claim 11, wherein detecting further includes identifying, by the automated bot, the transaction as an intention communicated by the user through natural language during the session.

18. The method of claim 17, wherein identifying further includes identifying, by the automated bot, an item or an order along with item or order details that are associated with the intention.

19. A system, comprising:
- a cloud-based server comprising a processor and a non-transitory computer-readable storage medium;
- the non-transitory computer-readable storage medium comprising executable instructions;
- the executable instructions when executed by the processor from the non-transitory computer-readable storage medium cause the processor to perform operations comprising:
- interacting with an enterprise to provide a frontend interface to a backend service provided by the enterprise, wherein the frontend interface uses an existing interface processed by the backend service of the enterprise;
- configuring an automated bot to provide the frontend interface over a messaging platform; and
- deploying the automated bot to the messaging platform to engage customers in natural language conversations and provide the backend service to the customers on behalf of the enterprise through the natural language conversations that are dynamically translated by the automated bot and provided to the backend service for processing using the frontend interface;
- wherein the automated bot uses an existing API of the messaging platform to interact with the customers and the automated bot appears as a real participant of the messaging platform;
- wherein the automated bot determines intentions of the customers during the natural language conversations based on speech of the customers, images of gestures taken by the customers, and written text provided by the customers; and
- wherein the automated bot is configured to perform a variety of pre-configured automated actions within the messaging platform and outside the messaging platform;
- wherein the automated bot provides a result received from the backend service in response to processing an action to the customer during the automated session.

20. The system of claim 19, wherein the backend service is an order service, a loyalty service, a reservation service, a financial service, or a purchase transaction service, and wherein the messaging platform is a social media platform.

* * * * *